US 9,049,435 B2

(12) United States Patent
Kim et al.

(10) Patent No.: US 9,049,435 B2
(45) Date of Patent: Jun. 2, 2015

(54) IMAGE PROVIDING APPARATUS AND IMAGE PROVIDING METHOD BASED ON USER'S LOCATION

(75) Inventors: Sang-yoon Kim, Goyang-si (KR);
Hee-seob Ryu, Hwaseong-si (KR);
Seung-kwon Park, Yongin-si (KR);
Jong-hyuk Jang, Gunpo-si (KR);
Chan-hee Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 383 days.

(21) Appl. No.: 13/294,712

(22) Filed: Nov. 11, 2011

(65) Prior Publication Data
US 2012/0120065 A1    May 17, 2012

(30) Foreign Application Priority Data
Nov. 12, 2010  (KR) .................. 10-2010-0112659

(51) Int. Cl.
G06T 19/00        (2011.01)
H04N 13/04        (2006.01)
(52) U.S. Cl.
CPC ....... *H04N 13/0409* (2013.01); *H04N 13/0468* (2013.01)
(58) Field of Classification Search
CPC .. G02B 27/2214; G02B 27/225; G06T 15/00; G06T 19/00; G06T 17/00; G06T 17/20; H04N 13/00–13/007
USPC .................. 345/418, 419; 359/463, 464, 619; 348/E13.03, 51; 430/321
See application file for complete search history.

(56) References Cited

U.S. PATENT DOCUMENTS

| | | | | | |
|---|---|---|---|---|---|
| 5,568,313 | A | * | 10/1996 | Steenblik et al. | 359/463 |
| 5,774,262 | A | * | 6/1998 | Schwerdtner et al. | 359/464 |
| 6,049,424 | A | * | 4/2000 | Hamagishi | 359/464 |
| 6,377,295 | B1 | | 4/2002 | Woodgate et al. | |
| 6,437,915 | B2 | * | 8/2002 | Moseley et al. | 359/465 |
| 7,046,272 | B2 | | 5/2006 | SchWerdtner | |
| 7,245,430 | B2 | * | 7/2007 | Kobayashi et al. | 359/464 |

(Continued)

FOREIGN PATENT DOCUMENTS

EP    2 395 762 A2   12/2011
EP    2 421 275 A2    2/2012

(Continued)

OTHER PUBLICATIONS

Thomas Peterka et al: "Dynallax: Dynamic parallax barrier autostereoscopic display", Jan. 1, 2007, XP55116451, total 134 pages Retrieved from the Internet: URL:http://search.proquest.com/docview/304725978.

(Continued)

*Primary Examiner* — Kimbinh T Nguyen
(74) *Attorney, Agent, or Firm* — Sughrue Mion, PLLC

(57) ABSTRACT

An image providing apparatus includes: a user location acquisition unit which acquires locations of users; a barrier adjustment unit which adjusts at least one of a space between a display and a barrier screen, a size of a barrier slot, and a left/right movement amount of the barrier slot at least based on a user's location of at least one of the users; an image generation unit which generates an image of which a view point region is adjusted, by the barrier adjustment unit, to the user's location; and an image output unit which outputs the generated image on a display.

20 Claims, 10 Drawing Sheets

(56) References Cited

U.S. PATENT DOCUMENTS

| | | |
|---|---|---|
| 8,248,462 B2 * | 8/2012 | Peterka et al. ............ 348/54 |
| 2004/0012851 A1 | 1/2004 | Sato et al. |
| 2004/0239758 A1 | 12/2004 | Schwerdtner |
| 2007/0183015 A1 | 8/2007 | Jacobs et al. |
| 2007/0279319 A1 | 12/2007 | Yamazaki et al. |
| 2008/0143895 A1 | 6/2008 | Peterka et al. |
| 2009/0123030 A1 * | 5/2009 | De La Barre et al. ........ 382/103 |
| 2010/0007582 A1 | 1/2010 | Zalewski |
| 2012/0062565 A1 * | 3/2012 | Fuchs et al. ............ 345/419 |

FOREIGN PATENT DOCUMENTS

| | | |
|---|---|---|
| GB | 2 317 710 A | 4/1998 |
| JP | 11-285029 A | 10/1999 |
| KR | 10-0667823 B1 | 1/2007 |
| WO | 01/18589 A1 | 3/2001 |
| WO | 03/032647 A1 | 4/2003 |
| WO | 2011/044936 A1 | 4/2011 |

OTHER PUBLICATIONS

Peterka T et al, "Advances in the Dynallax Solid-State Dynamic Parallax Barrier Autostereoscopic Visualization Display System", IEEE Transactions on Visualization and Computer Graphics, IEEE Service Center, Los Alamitos, CA, US, vol. 14, No. 3, May 1, 2008, pp. 487-499, XP011344477, DOI: 10.1109/TVCG.2007.70627.

Sang-Yi Yi et al, "Moving Parallax Barrier Design for Eye-Tracking Autostereoscopic Displays Sang-Yi Yi, Ho-Byung Chae and Seung-Hyun Lee", Jan. 1, 2008, XP055116100, total 4 pages, Retrieved from the Internet: URL:http://ieeexplore.ieee.org/ielx5/4539739/4547776/04547834.pdf?tp=&arnumber=4547834&isnumber=4547776.

Seung-Hyun Lee et al, "Moving Parallax Barrier Panel Design Using Cross Connector", Digital Holography and Three-Dimensional Imaging, vol. 68906910, Jan. 1, 2008, p. DWA2, XP55116093, total 3 pages, Washington, D.C., DOI: 10.1364/DH.2008.DWA2.

Markus Andiel, et al, "Eye-tracking for Autostereoscopic Displays using Web Cams", Jan. 1, 2002, XP55116095, total 7 pages, Retrieved from the Internet: URL:http://proceedings.spiedigitallibrary.org/data/Conferences/SPIEP/29492/200__1.pdf.

Hentschke S. "Personenadaptiver Autostereoskoper Monitor (PAAS)—Eine Option Fuerden Fernseher?", FKT Fernseh und Kinotechnick, Fachverlag Schiele & Schon GMBH., Berlin, DE, vol. 50 , No. 5, May 1, 1996, pp. 242-246,248, XP000592204, total 7 pages.

Tom Peterka et al, "Dynallax: Solid State Dynamic Parallax Barrier Autostereoscopic VR Display", Virtual Reality Conference, 2007. VR '07. IEEE, IEEE, PI, Mar. 1, 2007, pp. 155-162 (total 8 pages), XP031080307.

Isono H et al, "Autostereoscopic 3-D Display Using LCD-Generated Parallax Barrier", Electronics & Communications in Japan, Part II—Electronics, Wiley, Hoboken, NJ, US, vol. 76, No. 7, Jul. 1, 1993, pp. 77-83, XP000429012, DOI: 10.1002/ECJB.4420760709.

Communication from the European Patent Office issued May 14, 2014 in a counterpart European Application No. 11188804.6.

* cited by examiner

IMAGE PROVIDING APPARATUS AND IMAGE PROVIDING METHOD BASED ON USER'S LOCATION

CROSS-REFERENCE TO RELATED APPLICATION

This application claims priority from Korean Patent Application No. 10-2010-0112659, filed Nov. 12, 2010, in the Korean Intellectual Property Office, the disclosure of which is incorporated herein by reference in its entirety.

BACKGROUND

1. Field

Apparatuses and methods consistent with exemplary embodiments relate to an image providing apparatus and an image providing method, and more particularly to an image providing apparatus and an image providing method, in which two or more users can view different images using one image providing apparatus.

2. Description of the Related Art

Three-dimensional (3D) image technology may be used in various application fields, such as information communication, broadcasting, medical treatment, educational training, military affairs, games, animation, virtual reality, computer-aided design (CAD), industrial technology, and the like.

A 3D implementation method may be implemented as a non-glasses method and a glasses method.

The non-glasses method may include a parallax barrier method and a lenticular lens method.

The glasses method may include a passive method, an active method, and an anaglyph method.

As the non-glasses method, the parallax barrier method and a lenticular screen method, which can be simply manufactured and easily implemented, are mainly used. These two methods are used through installation of an optical plate, such as a parallax barrier or a lenticular screen, in front of or in the rear of a display screen. In general, these methods have a fairly narrow effective visual field, and thus only one person can use the methods.

The glasses method may be implemented as a side by side method, a top and bottom method, a checker board method, and a sequential frame method.

A 3D image providing apparatus encodes a 3D image signal and transmits the encoded 3D image signal to a 3D display.

The 3D display may be a passive type and an active type in accordance with the method of reproducing the 3D image signal.

A two-dimensional (2D) image providing apparatus or a 3D image providing apparatus displays different images by dividing a portion of a display screen or dividing the display screen into left and right portions for multi-display.

That is, the multi-display is implemented by a picture-in-picture (PIP) method in which an auxiliary display screen is inserted into a specified position of a main display screen or a double screen method in which two images having the same size are displayed side by side on the left and right sides of the display screen, respectively.

There is a need to simultaneously provide images in a full-screen state to two or more users through one image providing apparatus.

SUMMARY

Exemplary embodiments may address at least the above problems and/or disadvantages and other disadvantages not described above. Also, exemplary embodiments are not required to overcome the disadvantages described above, and an exemplary embodiment may not overcome any of the problems described above.

Accordingly, exemplary embodiments provide an image providing method and apparatus, which can display different images in a full-screen state through one image providing apparatus based on locations of two or more users.

According to an aspect of an exemplary embodiment, there is provided an image providing apparatus which includes a user location acquisition unit acquiring locations of two or more users; a barrier adjustment unit adjusting at least one of a space between a display and a barrier screen, a size of a barrier slot, and a left/right movement amount of the barrier slot based on the user's location; an image generation unit generating an image of which the view point region is adjusted to the user's location through the adjusted barrier; and an image output unit outputting the generated image through the display.

The user location acquisition unit may acquire at least one of upper/lower locations and left/right locations of the two or more users, and the image may be output through the display in accordance with the acquired at least one of the upper/lower locations and the left/right locations.

The left/right location may indicate the degree of left/right deviation from a center of the display.

The upper/lower location may indicate a distance from the display to the user.

The barrier adjustment unit may adjust the at least one of the space between the display and the barrier screen, the size of the barrier slot, and the left/right movement amount of the barrier slot based on an on/off state of a voltage that is applied to the barrier screen.

The barrier adjustment unit may adjust the space between the display and the barrier screen using a motor.

The barrier screen may include a plurality of barrier screens, wherein the barrier adjustment unit may adjust a space between the display and at least one of the plurality of barrier screens.

The barrier adjustment unit may adjust the space between the display and the at least one of the plurality of barrier screens based on an on/off state of a voltage that is applied to the at least one of the plurality of barrier screens.

The barrier of the barrier screen and the barrier slot may be configured to overlap with different sizes.

Different voltages may be applied to the barrier and the barrier slot with different sizes, and the barrier adjustment unit may adjust the at least one of the space between the display and the barrier screen, the size of the barrier slot, and the left/right movement amount of the barrier slot based on the different voltages.

The barrier adjustment unit may adjust the space between the display and the barrier screen using a lens that moves in a direction of an optical axis.

The user location acquisition unit may acquire the distance from the display to the user using a disparity map using a stereoscopic camera or a depth camera.

The user location acquisition unit may acquire the user's location using at least one of a face and a contour of the user.

The user location acquisition unit may confirm whether the two or more users are on the same line, and the barrier adjustment unit may perform different processes in accordance with the result of the confirmation.

In the case where the two or more users are on the same line, the barrier adjustment unit may adjust the slot of the barrier based on a distance between one user and another user of the two or more users, while in the case where the two or more users are not on the same line, the barrier adjustment unit may adjust the slot of the barrier based on a point where the same line of the one user and a virtual line that is connected from the center of the display to the other user.

According to another aspect of an exemplary embodiment, there is provided an image providing method which includes acquiring locations of two or more users; adjusting at least one of a space between a display and a barrier screen, a size of a barrier slot, and a left/right movement amount of the barrier slot based on the user's location; generating an image of which the view point region is adjusted to the user's location through the adjusted barrier; and outputting the generated image through the display.

The step of acquiring the locations of the two or more users may include acquiring at least one of upper/lower locations and left/right locations of the two or more users; and outputting the image through the display in accordance with the acquired at least one of the upper/lower locations and the left/right locations.

The step of adjusting the at least one of the space between the display and the barrier screen, the size of the barrier slot, and the left/right movement amount of the barrier slot may be based on an on/off state of a voltage that is applied to the barrier screen.

The barrier screen may include a plurality of barrier screens, wherein the adjusting step may further include adjusting a space between the display and at least one of the plurality of barrier screens.

According to another aspect of an exemplary embodiment, there is provided a computer-readable recording medium recorded with a program that performs at least one of the above-described methods.

According to exemplary embodiments, a technique is provided, in which two or more users can simultaneously view different images in full screen without deterioration of resolution using one image system.

Also, according to exemplary embodiments, a technique is provided, in which the view point regions are automatically adjusted in real time according to the locations of the two or more users, and a plurality of images do not overlap each other and the change between the different images is smooth.

BRIEF DESCRIPTION OF THE DRAWINGS

The above and/or other aspects will become more apparent by describing certain exemplary embodiments, with reference to the accompanying drawings, in which.

DETAILED DESCRIPTION OF EXEMPLARY EMBODIMENTS

Figure 1:
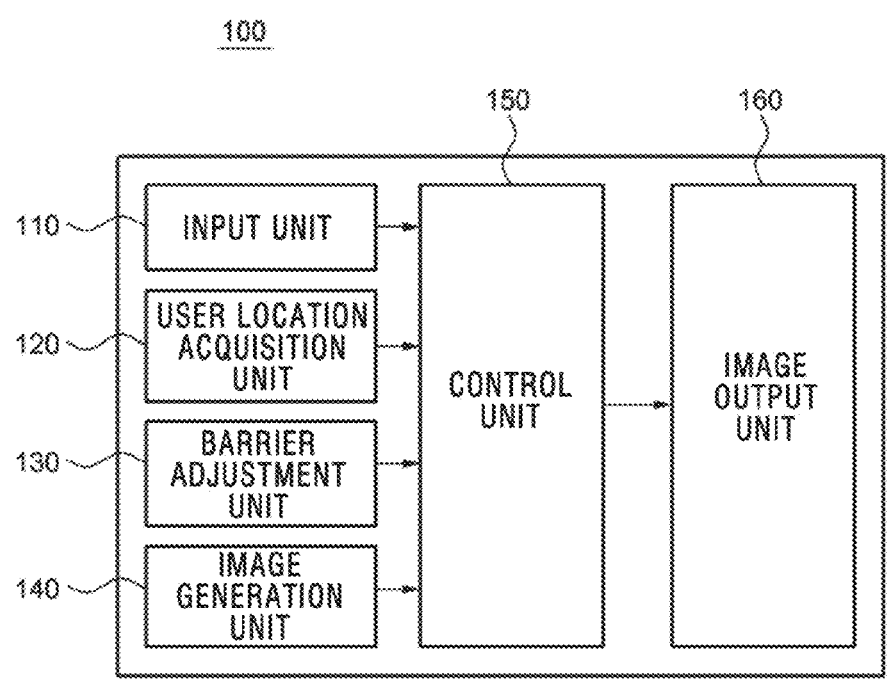
FIG. 1 is a block diagram illustrating the configuration of a 3D image providing system according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters.

FIG. 1 is a block diagram illustrating the configuration of a 3D image providing system according to an exemplary embodiment.

Referring to FIG. 1, an image providing apparatus 100 includes an input unit 110, a user location acquisition unit 120, a barrier adjustment unit 130, an image generation unit 140, a control unit 150, and an image output unit 160.

The image providing apparatus 100 may receive a 3D image from at least one of a TV channel, a video, a PC, a DVD, and an image medium, and may display the 3D image on a display unit (not illustrated).

The image providing apparatus 100 may include one of a 2D mode, a multi-channel 2D mode, a 3D mode, and a multi-channel 3D mode.

The 2D mode corresponds to a state where a 2D image is displayed, and the 3D mode corresponds to a state where a 3D image is displayed.

The multi-channel mode corresponds to a state where different images are simultaneously displayed.

The input unit 110 includes a user interface (UI), and a user command may be input through the input unit 110.

In accordance with the user's selection through the input unit 110, one of the 2D mode and the 3D mode may be selected.

In accordance with the user's selection through the input unit 110, one of a single channel and a multi-channel may be selected.

The user location acquisition unit 120 may include a sensor of a stereoscopic camera or a sensor of a depth camera to acquire data about user's distance and direction.

The user location acquisition unit 120 may be built in a system as an algorithm, and may acquire the distance between the user's location and a display through a disparity map of left and right images obtained using the stereoscopic camera or depth information obtained using the depth camera.

The stereoscopic camera or the depth camera may be installed in an upper portion of the image providing apparatus 100.

The user location acquisition unit 120 may acquire the user's location using a user's face or a user's contour.

The user location acquisition unit 120 may also perform a general function of acquiring other information.

The barrier adjustment unit 130 may adjust a view point region based on data that is obtained by the user location acquisition unit 120. That is, the barrier adjustment unit 130 may adjust the point where an image is formed in accordance with the user's location.

The barrier adjustment unit 130 may adjust a space between a display 210 and a barrier screen 220, a size of a barrier slot 221, and a left/right movement amount of the barrier slot 221.

The image generation unit 140 may generate output data for displaying a 3D image.

The control unit 150 controls the space between the display 210 and the barrier screen 220 for adjusting the view point region, the size of the barrier slot 221, and a left/right movement signal of the barrier slot 221.

The control unit 150 may control data input/output between elements of the apparatus.

The image output unit 160 may include the display unit (not illustrated), and may output a plurality of 3D images.

Figure 2:
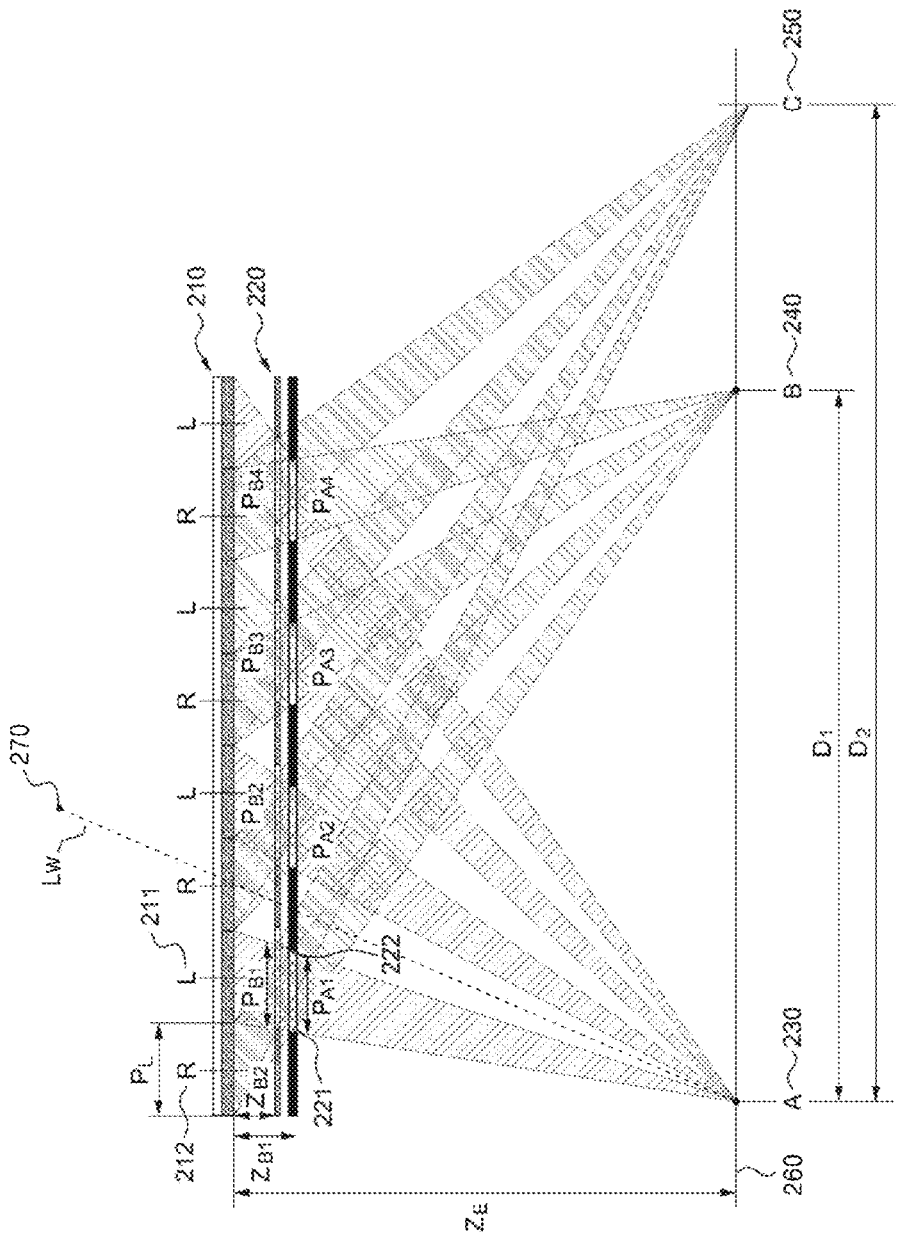
FIG. 2 is a diagram illustrating an example in which different images are displayed to a plurality of users according to an exemplary embodiment.

FIG. 2 is a diagram illustrating an example in which different images are displayed to a plurality of users according to an exemplary embodiment.

An exemplary embodiment illustrated in FIG. 2 corresponds to an example of a parallax barrier that is composed of a barrier and a barrier slot.

Referring to FIG. 2, a left-eye image 211 of a 3D image may be formed on a first user A represented by a numeral 230, and a right-eye image 212 of the 3D image may be formed on a second user B represented by a numeral 240.

The left-eye image 211 and the right-eye image 212 may be different images or may be composed of different polarized lights.

The barrier screen 220 may exert an influence on the transmission of the left-eye image 211 and the right-eye image 212 which are composed of different polarized lights that pass through the barrier screen 220 in dependence on the polarized lights.

The barrier screen 220 may exert an influence on the left-eye image 211 so that the left-eye image 211 is formed in another direction and may not exert an influence on the right-eye image 212 so that the right-eye image 212 is sent to the position where the right-eye image is originally formed.

Using the polarization dependency of the barrier screen 220, the left-eye image 211 may be sent to the first user 230 and the right-eye image 212 may be sent to the second user 240.

The size of the barrier slot 221 and the left/right location of the barrier slot 221 may be adjusted so that the left-eye image 211 is formed on the left eye and the right-eye image 212 is formed on the right eye in a state where the left-eye image 211 and the right-eye image 212 are apart from each other for a distance between the left and right eyes of the first user 230.

Using the size of the barrier slot 221 and the left/right movement amount of the barrier slot 221 that is located on the barrier screen 220, the right-eye image 212 may be sent to a third user C represented by a numeral 250.

Using the size of the barrier slot and the left/right movement of the barrier slot, the image may be simultaneously formed on the third user 250 who is located on the same straight line 260 as the first user A, wherein the line 260 is substantially parallel to at least one of the display and the barrier screen.

That is, the left-eye image 211 may be formed on the first user 230, and the right-eye image 212 may be formed on the second user 240. In the case where a location is moved to a new location such as a location of the third user 250 who is on the same straight line 260, the right-eye image 212 formed on the second user 240 may be formed on the third user 250 using the size of the barrier slot and the left/right movement of the barrier slot.

The user location acquisition unit 120 may acquire at least one of an upper/lower location and a left/right location of the first user 230 or the second user 240, and the left-eye image 211 or the right-eye image 212 may be output through the image output unit 160 in accordance with the acquired at least one of the upper/lower location and the left/right location.

The left/right location may indicate the degree of left/right deviation from the center point 270 of the display 210, and the upper/lower location may indicate a distance from the display 210 to a corresponding user such as the first user 230.

Referring to FIG. 2, when the left-eye image 211 is formed on the first user 230 and the right-eye image 212 is formed on the second user 240 or when the right-eye image 212 is formed on the third user 250 using the left/right movement of the barrier slot 221, the size of the barrier slot 221 and the distance between the display 210 and the barrier screen 220 may be expressed by the equations below.

The sizes PA and PB of the barrier slots 221 and 222 and the distances ZB1 and ZB2 between the display 210 and the barrier screen 220 may be expressed by Equation (1).

$$PA = (PL \times D1)/(D1+PL), PB = (PL \times D2)/(D2+PL),$$

$$ZB1 = (PL \times ZE)/(D1+PL), ZB2 = (PL \times ZE)/(D2+PL) \qquad (1)$$

Here, PA represents the size of the barrier slot 221 when the right-eye image 212 is formed on the second user 240, PB represents the size of the barrier slot 222 when the right-eye image 212 is formed on the third user 250, ZB1 represents the distance between the display and the barrier screen when the right-eye image 212 is formed on the second user 240, ZB2 represents the distance between the display and the adjusted barrier screen when the right-eye image 212 is formed on the third user 250, ZE represents the distance between the first user 230 and the display 210, and PL represents the length of the right-eye image 212 or the left-eye image 211 on the display, where L is an integer. D1 represents the distance between the first user 230 and the second user 240, and D2 represents the distance between the first user 230 and the third user 250.

The barrier adjustment unit 130 may adjust the location where the right-eye image 212 is formed before the left/right movement of the barrier slot 221 is determined and the location where the right-eye image 212 is formed after the left/right movement of the barrier slot 221 is determined differently from each other.

The barrier adjustment unit 130 may adjust at least one of the space between the display 210 and the barrier screen 220, the size of the barrier slot 221, and the left/right movement amount of the barrier slot 221 based on an on/off state of a voltage value that is applied to the barrier screen 220.

Figure 3:
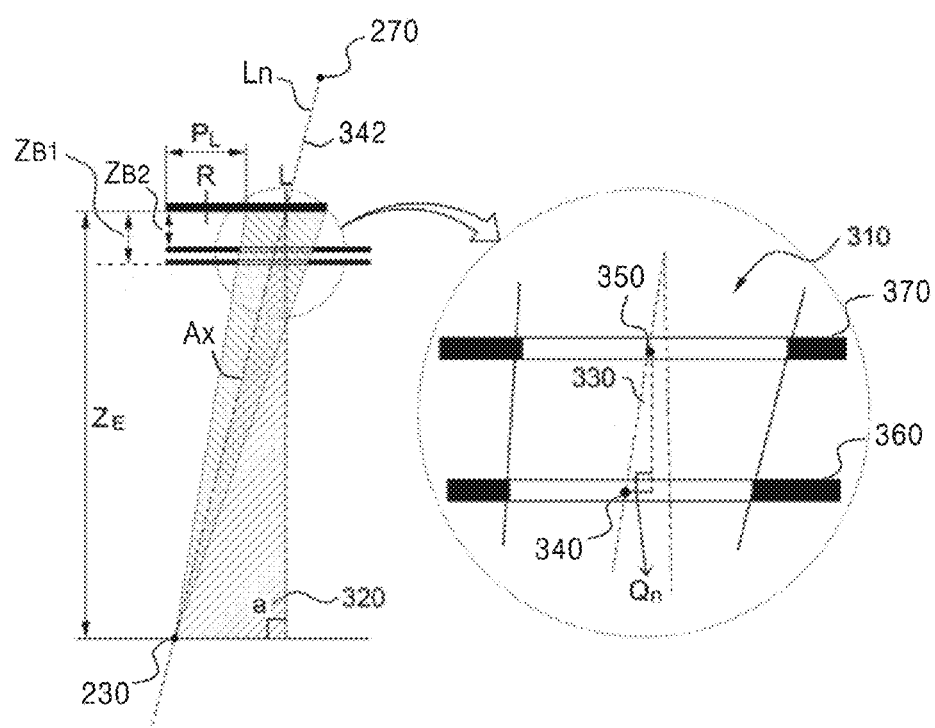
FIG. 3 is a diagram illustrating an example of changing the location of a barrier slot based on a user's location.

FIG. 3 is a diagram illustrating an example of changing the location of a barrier slot based on a user's location.

Referring to FIG. 3, since the location where the right-eye image 212 is formed is adjusted in accordance with the location of the barrier slot 221, the variation amount Qn on the center point of the barrier slot may be expressed by Equation (2) using a proportional expression of similar figures of a triangle 320 and a triangle 330.

$$(Ln - Ax) : Qn = ZE : (ZB1 - ZB2)$$

$$Qn = (Ln - Ax) \cdot (ZB1 \cdot ZB2)/ZE \qquad (2)$$

Here, Ln represents a distance from the center point 270 of the display to the center of the left-eye image 211, where n is an integer, Ax represents a distance from the center point 270 of the display to the first user 230, where x is an integer, Qn represents a difference between a location of the center point 340 that is an intersection of a straight line 342 extending from the center point 270 to the location of the first user 230 and a barrier slot on the barrier screen 360 when the right-eye image 212 is formed on the second user 240 and a location of the center point 350 that is an intersection of the line 342 extending from the center point 270 to the location of the first user 230 and the barrier slot of the barrier screen 370 that is changed when the location is moved to the location of the third user 250, where n is an integer.

From Equation (2), the difference between the location of the center point 340 of the barrier slot when the right-eye image 212 is formed on the second user 240 and the location of the center point 350 of the barrier slot when the right-eye image 212 is formed on the third user 250 may be determined.

The barrier adjustment unit 130 may calculate the movement amount of the barrier slot 221 using the above-described difference.

Figure 4:
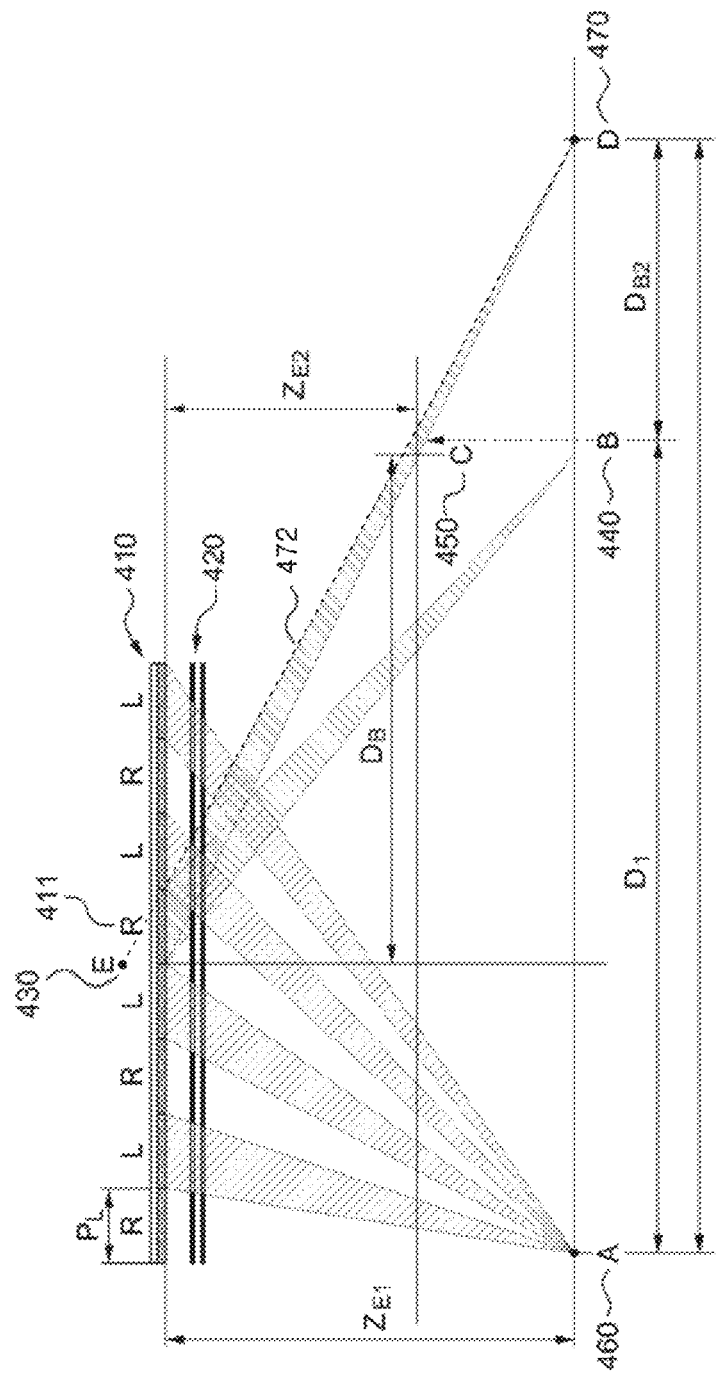
FIG. 4 is a diagram illustrating an example of changing a distance between a display and a barrier screen based on a user's location.

FIG. 4 is a diagram illustrating an example of changing a distance between a display 410 and a barrier screen 420 based on a user's location.

Referring to FIG. 4, in the case where a third user 450 has moved to a different location in the upward/downward direction, the distance between the display 410 and the barrier screen 420 may be adjusted.

A virtual point D (represented by a numeral 470) which is an intersect point of a straight line 472 that extends from the center point E (represented by a numeral 430) of the display to the third user 450 and the line 260 which extends substantially parallel to at least one of the display and the barrier screen from the first user 460 is obtained.

Using the virtual point 470 that is on the same line as the first user 460, Qn in Equation (2) may be calculated.

A proportional expression for obtaining the movement distance DB2 from the second user to the virtual point D is given by Equation (3):

$$(ZE1-ZE2):ZE2=DB2:DB$$

$$DB2=(ZE1 \cdot ZE2) \times DB/ZE2 \quad (3)$$

Here, DB represents the distance from the center point 430 of the display to the third user 450, ZE2 represents the distance from the display 410 to the third user 450, and DB2 represents the distance from the second user 440 to the virtual point 470.

Once the distance DB2 is calculated, the distance to the virtual point 470 which is on the same line as the first user 460 may be calculated.

The barrier adjustment unit 130 may calculate the left/right movement of the barrier slot 221, the size of the barrier slot 221, and the distance between the display 410 and the barrier screen 420 using Equation (1) including the distance between the first user 460 and the virtual point 470.

The barrier adjustment unit 130 may adjust the image that is formed on the first user 460, the second user 440, or the third user 450 via the virtual point 470 using the result of the calculation.

In the case, where the second user 440 has moved to the third user 450 in the upward/downward direction, the barrier adjustment unit 130 may adjust the location where the right-eye image 411 is formed before the upward/downward direction is determined and the location where the right-eye image 411 is formed after the upward/downward direction is determined differently from each other.

Figure 5:
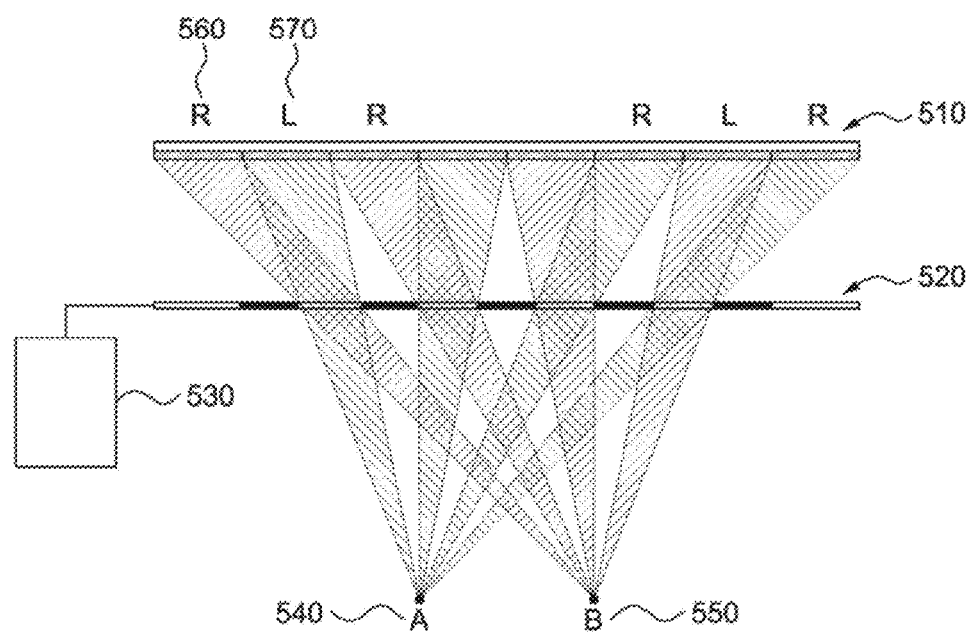
FIG. 5 is a diagram illustrating an example of a 3D image providing apparatus using a motor according to an exemplary embodiment.

FIG. 5 is a diagram illustrating an example of a 3D image providing apparatus using a motor according to an exemplary embodiment.

Using a motor 530, the distance between a display 510 and a barrier screen 520 may be adjusted, and the left/right movement of the barrier screen 520 may be adjusted.

Using the barrier screen 520 that has been moved by the motor 530, the right-eye image 560 may be formed on the second user 550, and the left-eye image 570 may be formed on the first user 540.

The barrier adjustment unit 130 may adjust the space between the display 510 and the barrier screen 520 or the left/right movement of the barrier screen 520 by adjusting the voltage value that is applied to the motor 530.

Figure 6:
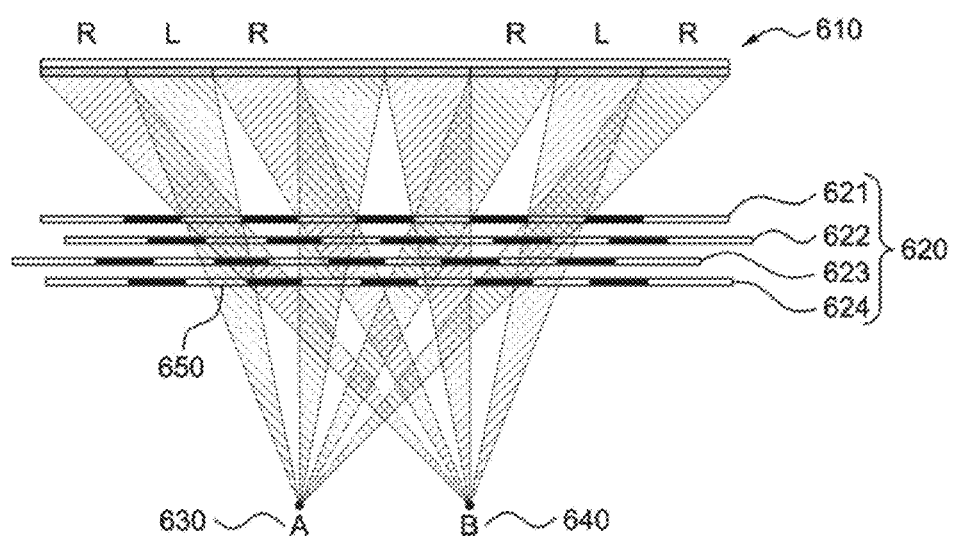
FIG. 6 is a diagram illustrating an example of a 3D image providing apparatus using a plurality of barrier screens according to an exemplary embodiment.

FIG. 6 is a diagram illustrating an example of a 3D image providing apparatus using a plurality of barrier screens according to an exemplary embodiment.

A plurality 620 of barrier screens may include barrier screens 621, 622, 623, and 624.

The plurality 620 of barrier screens may be formed of liquid crystals. The liquid crystals intercept light that passes through the plurality 620 of barrier screens in accordance with the on/off state of the voltage.

The voltage may flow through transparent electrodes provided on the plurality 620 of barrier screens.

In accordance with the characteristic of the voltage that is applied to the plurality 620 of barrier screens, the distance between the display 610 and the plurality 620 of barrier screens or the left/right location of the barrier slot 650 may be selected.

That is, since the lengths, the thicknesses, or the shapes of the electrodes provided on the plurality 620 of barrier screens are different from each other, the level of the voltage that is applied to the plurality 620 of barrier screens is adjustable, and the location of the applied voltage is selectable, the position of the barrier slot 650 may be selected.

In accordance to an electrode to which the voltage is applied to, the plurality 620 of barrier slots may be adjusted.

For example, the voltage is applied to the barrier screen 621 is compared to the voltage applied to the barrier screen 624. The distance between the display 610 and the barrier screen 621 or the barrier screen 624 may be adjusted in accordance with which barrier screen the voltage is applied to.

That is, in accordance with which barrier screen 621, 622, 623, or 624 of the plurality 620 of barrier screens the voltage is applied to, the distances between the display 610 and the plurality 620 of barrier screens may be adjusted.

The barrier adjustment unit 130 may adjust the space between the display 610 and at least one of the plurality 620 of barrier screens through adjustment of the location of the voltage that is applied to the plurality 620 of barrier screens.

The barrier adjustment unit 130 may adjust the space between the display 610 and at least one of the plurality 620 of barrier screens based on the on/off state of the voltage that is applied to the at least one of the plurality 620 of barrier screens.

Figure 7:
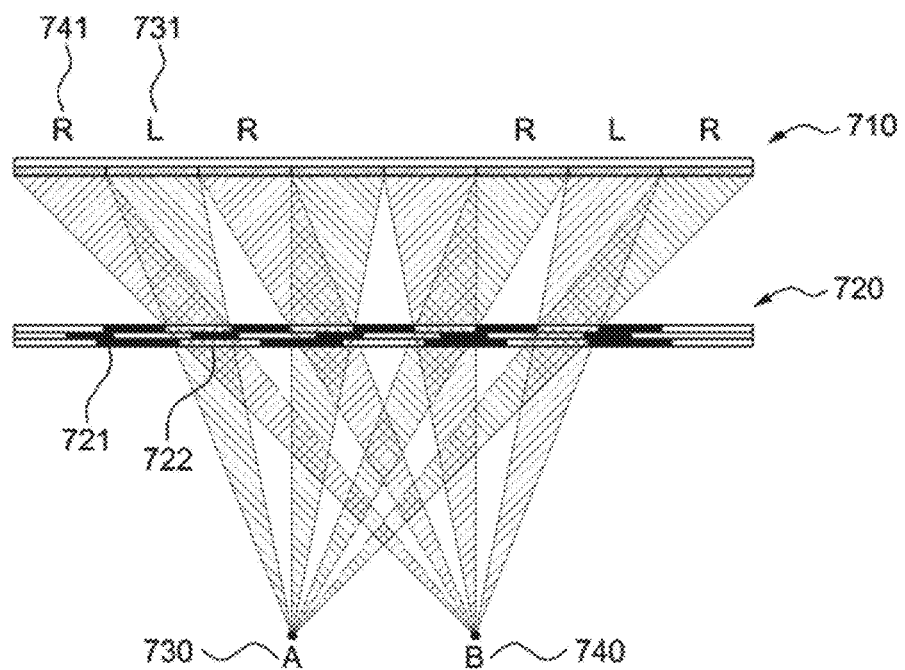
FIG. 7 is a view illustrating an example of a 3D image providing apparatus using overlapping of different barrier slots according to an exemplary embodiment.

FIG. 7 is a view illustrating an example of a 3D image providing apparatus using overlapping of different barrier slots according to an exemplary embodiment.

On one barrier screen 720, a plurality of barriers 721 and a plurality of barrier slots 722 overlap each other.

In the same manner as in FIG. 6, the plurality of barriers 721 and the plurality of barrier slots 722 may be formed of liquid crystals, and in accordance with the voltage that is applied to the liquid crystals, the location of a left-eye image 731 that is formed on a first user 730 or the location of a right-eye image 741 that is formed on a second user 740 may be adjusted.

That is, in accordance with the location of the voltage that is applied to the barrier screens 720 which are formed layer upon layer and the forming of transparent electrodes formed on the barrier screens 720, the distance between the display and the barrier screen 720 and the left/right location of the barrier slot 722 may be adjusted.

The barrier adjustment unit 130 may adjust at least one of the space between the display 710 and the barrier screen 720, the size of the barrier slot 722, and the left/right movement amount of the barrier slot 722 based on different voltages which are applied to the barriers and the barrier slots having different sizes.

Figure 8:
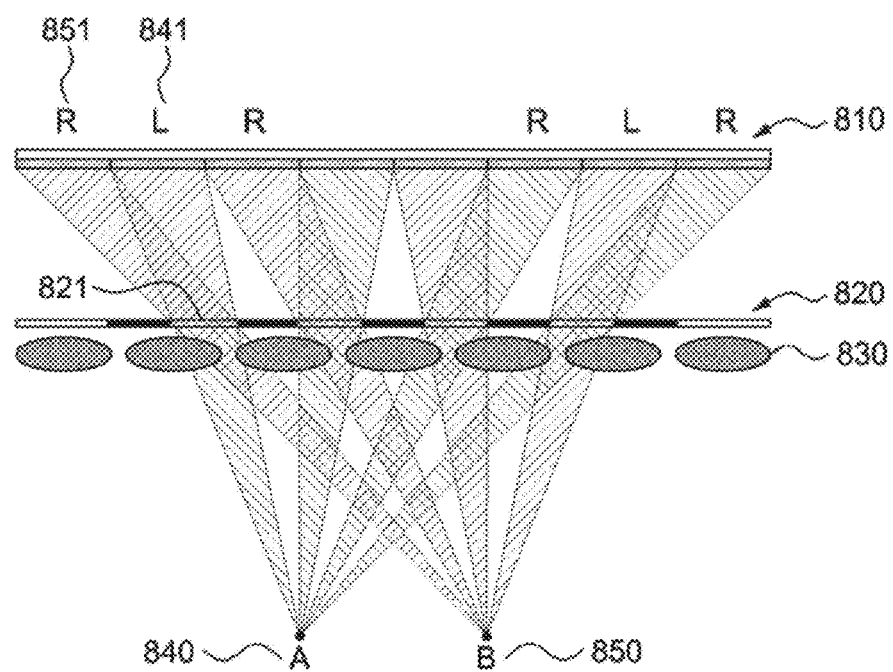
FIG. 8 is a view illustrating an example of a 3D image providing apparatus using a lens according to an exemplary embodiment.

FIG. 8 is a view illustrating an example of a 3D image providing apparatus using a lens according to an exemplary embodiment.

A lens or lenses 830 may be located between the barrier screen 820 and the first user 840 or between the display 810 and the barrier screen 820.

The lens 830 gathers or diverges light, and the angle of the transmitted light is changed in accordance with the incident angle of the light that is incident to the lens 830.

It is possible to adjust the distance between the display 810 and the barrier screen 820 and the location movement of the barrier slot 821 using the above-described characteristics of the lens 830.

If the lens 830 is moved in the direction of the optical axis, the location of the left-eye image 841 that is formed on the first user 840 or the location of the right-eye image 851 that is formed on the second user 850 may be changed.

The optical axis means a vertical direction in which the display 810 and the barrier screen 820 are connected to each other.

If the lens 830 is moved in the left/right direction, the location of the right-eye image 851 that is formed on the second user 850 may be changed to the left or to the right.

The left/right direction means a direction that is parallel to the barrier screen 820.

The barrier adjustment unit 130 may adjust the space between the display 810 and the barrier screen 820 using a lens that is moved in the direction of the optical axis, and may adjust the location of the image that is formed on the user using the lens 830 that is moved in the left/right direction.

Figure 9:
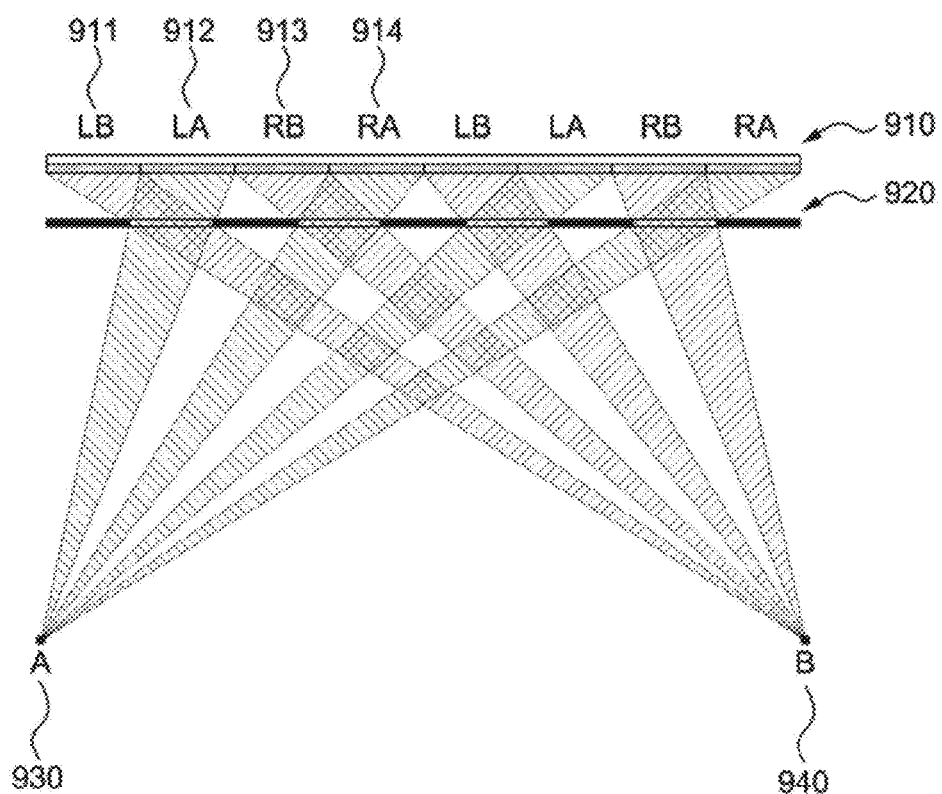
FIG. 9 is a diagram illustrating an example in which different 3D images are displayed to a plurality of users according to an exemplary embodiment.

FIG. 9 is a diagram illustrating an example in which different 3D images are displayed to a plurality of users according to an exemplary embodiment.

In order for a first user 930 and a second user 940 to view different 3D images, the left-eye image 211 of FIG. 2 may be divided into left-eye images 911 and 912, and the right-eye image 212 may be divided into right-eye images 913 and 914.

Referring to FIG. 9, the left-eye images 911 and 912 and the right-eye images 913 and 914 may be alternately located on a display 910.

That is, the left-eye image 211 of FIG. 2 is divided into the left-eye images 911 and 912 of FIG. 9, and the right-eye image 212 is divided into the right-eye images 913 and 914.

The method of adjusting a barrier screen 920 may be the same as described above regarding FIG. 2.

The barrier screen 920 is adjusted by the barrier adjustment unit 130 in a manner that the left-eye image 911 and the right-eye image 913 are formed on the second user 940, and the left-eye image 912 and the right-eye image 914 are formed on the first user 930.

The barrier adjustment unit 130 may adjust the plurality of 3D images to be formed at different locations by adjusting the space between the barrier screen 920 and the display 910 that is composed of left-eye images 911 and 912 and the right-eye images 913 and 914 alternately arranged.

Figure 10:
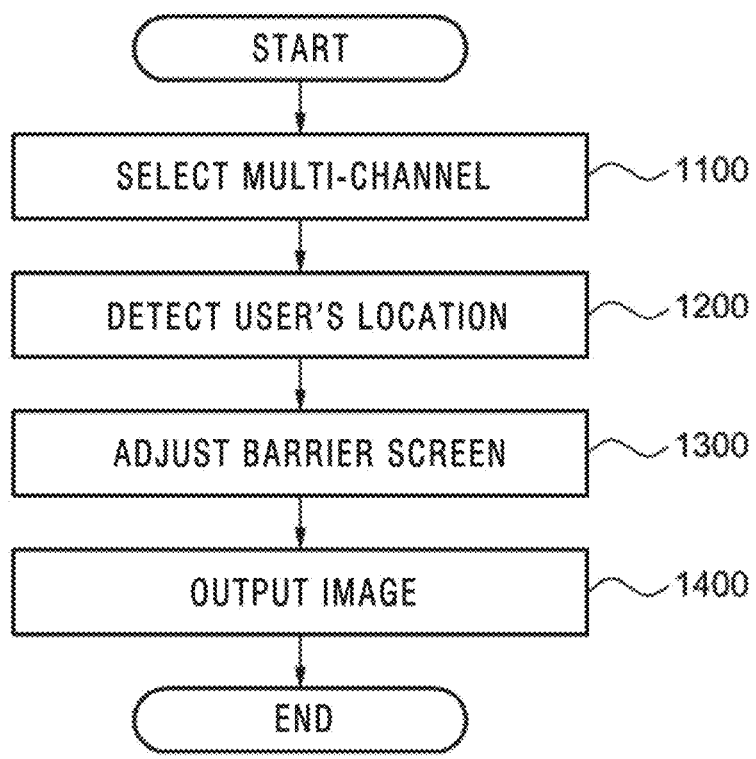
FIG. 10 is a flowchart illustrating a method in which different images are displayed according to an exemplary embodiment.

FIG. 10 is a flowchart illustrating a method in which different images are displayed according to an exemplary embodiment.

In order for a plurality of users to view different images, a multi-channel is selected (1100). If the multi-channel is selected, the faces of the plurality of users are searched for by using a camera.

If the plurality of users exists, distances between the display and the plurality of users and the users' locations are detected using the user location acquisition unit 120 that acquires the locations of two or more users (1200).

Relative locations of the plurality of users are detected using the user location acquisition unit 120.

The user location acquisition unit 120 may acquire the distances from the display to the plurality of users using a disparity map using a stereoscopic camera or a depth camera.

The user location acquisition unit 120 may acquire the users' locations using at least one of the faces and contours of the users.

The user location acquisition unit 120 confirms whether two or more users are on the same line, and the barrier adjustment unit 130 may perform different processes in accordance with the result of the confirmation.

If the users are on the same line, the barrier adjustment unit 130 may adjust the barrier slot based on the distance between one user and the other user. If the two or more users are not on the same line, the barrier adjustment unit 130 may adjust the barrier slot based on the point where the same line of one user and the virtual line that is connected from the center of the display to the other user meet each other (1300).

If the plurality of users are on the same line, Equation (1) and Equation (2) are applied to the barrier adjustment unit 130. If the plurality of users are not on the same line, Equation (3) is applied to the barrier adjustment unit 130, to adjust the movement of the barrier screen or the location of the barrier slot.

The barrier screen may be adjusted using the barrier adjustment unit 130 that adjusts at least one of the space between the display and the barrier screen, the size of the barrier slot, and the left/right movement amount of the barrier slot based on the locations of the plurality of users.

The image generation unit 140 may generate 3D images in which the view point regions have been adjusted to the locations of the plurality of users through the adjusted barrier screens.

The image output unit 160 may output the generated 3D images through the display so that the different images are formed on the plurality of users, respectively (1400).

The methods according to exemplary embodiments may be implemented as program commands that can be executed through various computer means and recorded in a computer-readable medium. The computer-readable medium may have recorded thereon program commands, data files, data structures, and the like, singly or in combination. The program commands recorded in the computer-readable medium may be specially designed and configured or may be known and usable to computer software providers.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image providing apparatus comprising:
a user location acquisition unit which acquires locations of users;
a barrier adjustment unit which adjusts a size of a barrier slot based on a location of at least one of the users;
an image generation unit which generates an image of which a view point region is adjusted, by the barrier adjustment unit, to the user's location; and
an image output unit which outputs the generated image on a display,
wherein the user location acquisition unit acquires the user's location based on at least one of a face of the user and a contour of the user, and
wherein the barrier adjustment unit adjusts a space between the display and the barrier screen based on a lens that moves in a direction of an optical axis.

2. The image providing apparatus as claimed in claim 1, wherein the user location acquisition unit acquires at least one of upper/lower locations and left/right locations of the users, and
the image is output on the display in accordance with the acquired the at least one of the upper/lower locations and the left/right locations.

3. The image providing apparatus as claimed in claim 2, wherein the left/right locations indicate degrees of corresponding left or right deviations from a center point of the display, for corresponding users.

4. The image providing apparatus as claimed in claim 2, wherein the upper/lower locations indicate distances from the display to corresponding users.

5. The image providing apparatus as claimed in claim 1, wherein the barrier adjustment unit adjusts the at least one of a space between the display and the barrier screen, the size of the barrier slot, and a left/right movement amount of the barrier slot based on a voltage value that is applied to the barrier screen.

6. The image providing apparatus as claimed in claim 1, wherein the barrier adjustment unit adjusts a space between the display and the barrier screen using a motor.

7. The image providing apparatus as claimed in claim 1, wherein the barrier screen includes a plurality of barrier screens, and
the barrier adjustment unit adjusts a space between the display and at least one of the plurality of barrier screens.

8. The image providing apparatus as claimed in claim 7, wherein the barrier adjustment unit adjusts the space between the display and the at least one of the plurality of barrier screens based on a voltage value that is applied to the at least one of the plurality of barrier screens.

9. The image providing apparatus as claimed in claim 1, wherein the barrier of the barrier screen and the barrier slot are configured to overlap with different sizes.

10. The image providing apparatus as claimed in claim 9, wherein different voltage values are applied to the barrier and the barrier slot with different sizes, and
the barrier adjustment unit adjusts at least one of a space between the display and the barrier screen, the size of the barrier slot, and a left/right movement amount of the barrier slot based on the different voltage values.

11. The image providing apparatus as claimed in claim 1, wherein the user location acquisition unit acquires a distance from the display to the users using a disparity map using a stereoscopic camera or a depth camera.

12. The image providing apparatus as claimed in claim 1, wherein the user location acquisition unit confirms whether the users are positioned on a same first line extending substantially parallel to the barrier screen, and
the barrier adjustment unit performs processes different from one another in accordance with a result of the confirmation.

13. The image providing apparatus as claimed in claim 12, wherein:
when the users are positioned on the first line, the barrier adjustment unit adjusts the barrier slot based on a distance between one user and another user, and
when the users are not positioned on the first line, the barrier adjustment unit adjusts the barrier slot based on a point where the first line extending from the one user intersects a virtual line extending from a center point of the display to the another user.

14. An image providing method comprising:
acquiring locations of users;
adjusting a size of a barrier slot based on a location of at least one of the users;
generating an image of which a view point region is adjusted to the user's location by the adjusting; and
outputting the generated image on a display,
wherein the locations of the users is acquired based on at least one of a face of the user and a contour of the user, and
wherein a space between the display and the barrier screen is adjusted based on a lens that moves in a direction of an optical axis.

15. The image providing method as claimed in claim 14, wherein the acquiring the locations of the users comprises:
acquiring at least one of upper/lower locations and left/right locations of the users; and
outputting the image on the display in accordance with the acquired at least one of the upper/lower locations and the left/right locations.

16. The image providing method as claimed in claim 14, wherein the adjusting the size of the barrier slot is based on a voltage value that is applied to the barrier screen.

17. The image providing method as claimed in claim 14, wherein the barrier screen includes a plurality of barrier screens, and
the adjusting comprises adjusting a space between the display and at least one of the plurality of barrier screens.

18. A non-transitory computer-readable recording medium having recorded thereon a program which, when executed by a computer, causes the computer to perform an image providing method, the method comprising:
acquiring locations of users;
adjusting a size of a barrier slot based on a location of at least one of the users;
generating an image of which a view point region is adjusted to the user's location by the adjusting; and
outputting the generated image on a display,
wherein the locations of the users is acquired based on at least one of a face of the user and a contour of the user, and
wherein a space between the display and the barrier screen is adjusted based on a lens that moves in a direction of an optical axis.

19. An image providing apparatus comprising:
a user location acquisition unit which acquires locations of users;
a barrier adjustment unit which adjusts a size of a barrier slot and a temporary location at which an image is formed based on a location of at least one of the users;

an image generation unit which generates the image in the temporary location which is adjusted to the user's location; and an image output unit which outputs the generated image on a display, wherein the locations of the users is acquired based on at least one of a face of the user and a contour of the user, and wherein the barrier adjustment unit adjusts a space between the display and the barrier screen based on a lens that moves in a direction of an optical axis.

20. The image providing apparatus as claimed in claim 19, wherein the barrier adjustment unit adjusts at least one of a space between a display and a barrier screen, the size of the barrier slot, and a left/right movement amount of the barrier slot based on the user's location.

* * * * *